(12) United States Patent
Hartwick

(10) Patent No.: US 9,249,849 B2
(45) Date of Patent: Feb. 2, 2016

(54) METHODS AND MECHANISMS FOR THE ADJUSTMENT OF STIFFNESS IN VARIOUS EQUIPMENT AND DEVICES

(71) Applicant: Darrell J Hartwick, Newton, MA (US)

(72) Inventor: Darrell J Hartwick, Newton, MA (US)

(73) Assignee: Darrell J Hartwick, West Newton, MA (US)

( * ) Notice: Subject to any disclaimer, the term of this patent is extended or adjusted under 35 U.S.C. 154(b) by 79 days.

(21) Appl. No.: 14/215,784

(22) Filed: Mar. 17, 2014

(65) Prior Publication Data

US 2014/0265078 A1  Sep. 18, 2014

Related U.S. Application Data

(60) Provisional application No. 61/794,636, filed on Mar. 15, 2013.

(51) Int. Cl.
  *F16F 3/02* (2006.01)
  *F16F 1/04* (2006.01)

(52) U.S. Cl.
  CPC ............. *F16F 3/023* (2013.01); *F16F 1/041* (2013.01); *F16F 3/02* (2013.01)

(58) Field of Classification Search
  CPC ................. B60G 2202/1424; B60G 2202/132
  USPC ............ 267/25, 26, 28, 36.1, 37.1, 174, 154, 267/155, 169
  See application file for complete search history.

(56) References Cited

U.S. PATENT DOCUMENTS

| | | | |
|---|---|---|---|
| 1,588,900 A * | 6/1926 | McGrath | 280/283 |
| 3,669,566 A * | 6/1972 | Bourquardez et al. | 416/134 R |
| 5,961,288 A * | 10/1999 | Legendre et al. | 416/134 A |
| 7,670,351 B2 * | 3/2010 | Hartwick | 606/170 |
| 2006/0122013 A1 * | 6/2006 | Dodge et al. | 473/516 |
| 2010/0274088 A1 * | 10/2010 | West et al. | 600/140 |
| 2013/0085581 A1 * | 4/2013 | Lecomte et al. | 623/55 |
| 2014/0274494 A1 * | 9/2014 | Zarda, Jr. | 473/532 |

* cited by examiner

*Primary Examiner* — Melanie Torres Williams
(74) *Attorney, Agent, or Firm* — Travis Lee Johnson; David S. Einfeldt

(57) ABSTRACT

A device with stiffness adjustment has a housing having a plurality of passageways, each defining an axis. The device has a plurality of stiffness devices each having a plurality of flat springs elongated in the direction of the passageway axis. The plurality of stiffness devices are each rotatable about their respective passageway axis. In an embodiment, the device has a casing interposed between the wall of the passageway of the housing and the stiffness devices. The casing is a spring.

23 Claims, 8 Drawing Sheets

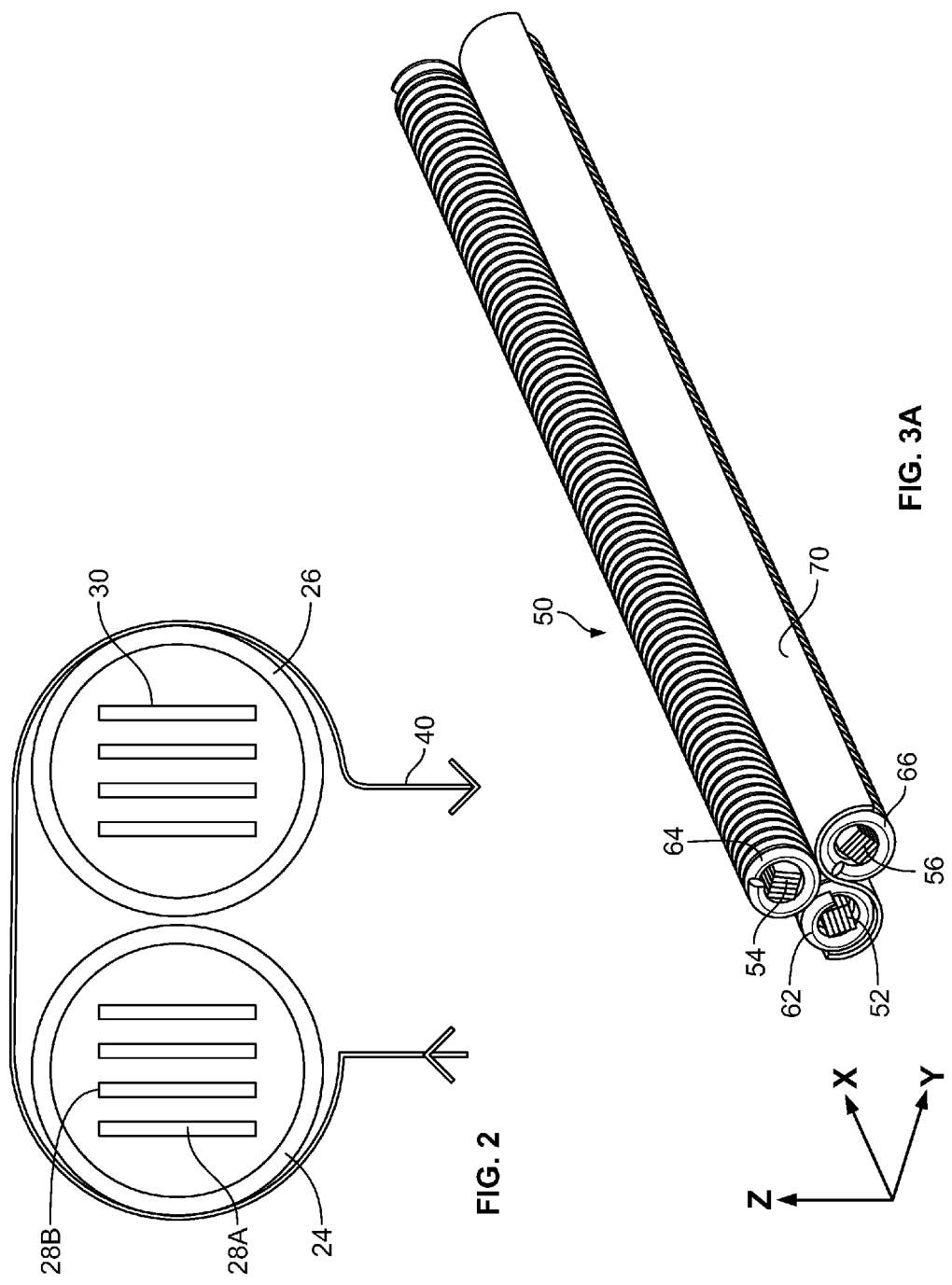

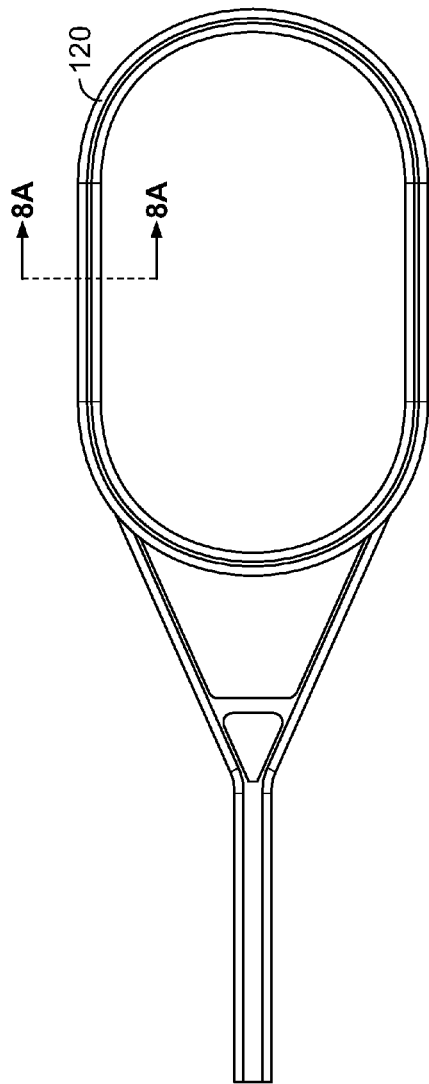
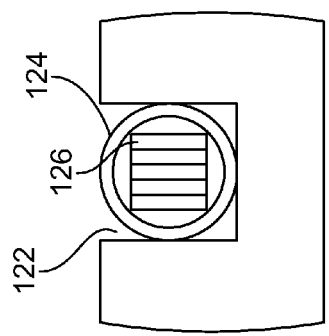
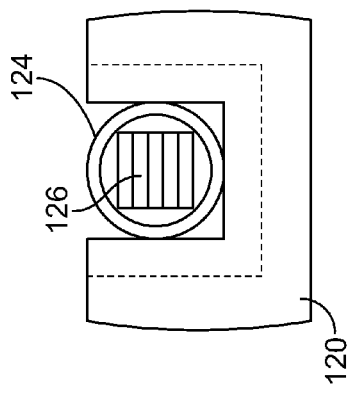
FIG. 7
FIG. 8A
FIG. 8B

METHODS AND MECHANISMS FOR THE ADJUSTMENT OF STIFFNESS IN VARIOUS EQUIPMENT AND DEVICES

CROSS-REFERENCE TO RELATED APPLICATIONS

This application claims the benefit of U.S. Patent Application 61/794,636 filed on Mar. 15, 2013 which is incorporated herein by reference.

FIELD OF THE INVENTION

The present invention relates generally to a stiffness adjustment device and more particular a plurality of stiffness adjustment devices located in equipment to allow tailoring of the product to the user and the conditions.

BACKGROUND OF THE INVENTION

In many areas of mechanical endeavor, means of adjustment are desirable, before, during, and after use. Sports equipment must be selected and/or adjusted for the particular conditions that currently exist, or which may be encountered. For example, users select skis, snow boards, tennis rackets, boots, and other equipment. Likewise, prosthetics must adapt to the various life situations in the course of a day.

SUMMARY OF THE INVENTION

It has been recognized that a means of adjusting mechanical devices before, during and after use is more desirable rather than selecting another similar device with different characteristics. For example, sports equipment must be selected for the particular conditions that currently exist, or which may be encountered. Likewise, mechanical devices could include other types of mechanical devices and equipment. For example, prosthetics must adapt to the various life situations in the course of a day.

In an embodiment of a device with stiffness adjustment, the device has a housing having a plurality of passageways, each defining an axis. The device has a plurality of stiffness devices each having a plurality of flat springs elongated in the direction of the passageway axis. The plurality of stiffness devices are each rotatable about their respective passageway axis.

In an embodiment, the device has a casing interposed between the wall of the passageway of the housing and the stiffness devices. In an embodiment, the casing is a protective covering. In an embodiment, the casing is a spring. In an embodiment, the spring is an extension spring. In an embodiment, the spring is a compression spring.

In an embodiment, the plurality of rotatable stiffness devices are each rotatable about their respective passageway axis between at least two distinct positions. In an embodiment, the plurality of rotatable stiffness devices each have a gearing mechanism for facilitating rotation. In an embodiment, the plurality of rotatable stiffness devices have an engaging mechanism. In an embodiment, the plurality of rotatable stiffness devices have an aperture adapted to receive a tool for adjusting the stiffness of the device.

In an embodiment, the plurality of rotatable stiffness devices are rotatable in a group. In an embodiment, the device has a geared strip and the plurality of rotatable stiffness devices, the geared strip coupled to the at least two of the plurality of rotatable stiffness devices for rotating the rotatable stiffness devices to adjust the stiffness of the device.

In an embodiment, the process of rotating the plurality of rotatable stiffness devices is automated. In an embodiment, the automated process is controlled by a user. In an embodiment, the device has a sensor wherein the automated process is controlled by the sensor.

In an embodiment, the housing is from the winter sport equipment group of ski and snowboard. In an embodiment, the housing is a prosthetic. In an embodiment, the housing is from the shoe group of ski boot and bicycling shoe.

In an embodiment, the plurality of stiffness devices each has a rectangular cross section having a ratio between a height dimension and a width dimension of at least 4:1.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a side view of a pair of stiffness adjustments with a gearing system for rotating the stiffness adjustment device;

FIG. 3A is a perspective view of a plurality of stiffness adjustment devices encased by an external packaging;

FIG. 7 is a top view of a racquetball racket;

FIG. 8A is a sectional view taken along the line 8A-8A in FIG. 7;

FIG. 8B is the sectional view of FIG. 8A with the stiffness adjustment in another position;

DETAILED DESCRIPTION OF THE INVENTION

It has been recognized that means of adjusting mechanical devices is desirable, before, during, and after use rather than selecting another similar device with different characteristics. For example, sports equipment must be selected for the particular conditions that currently exist, or which may be encountered. Other mechanical devices could include other types of mechanical devices and equipment. For example, prosthetics must adapt to the various life situations in the course of a day.

Figure 1A:
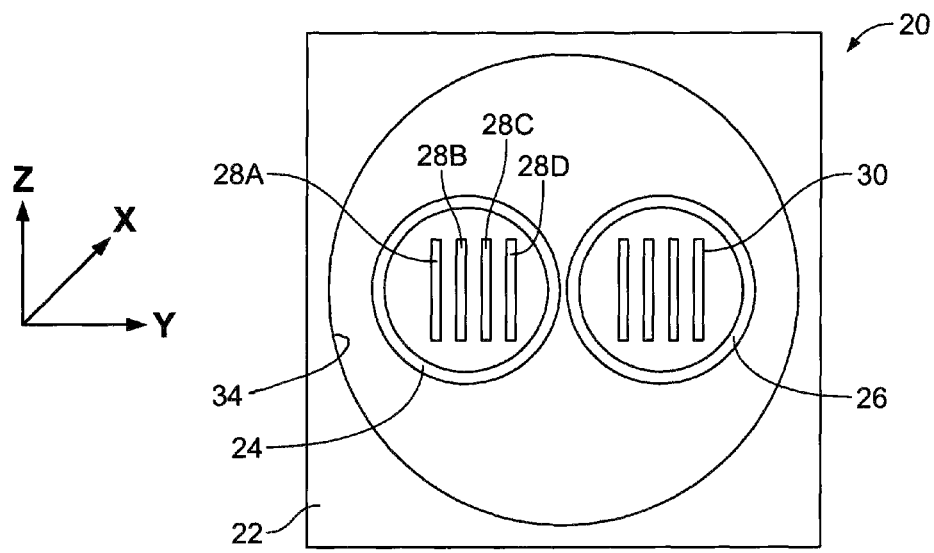
FIG. 1A is a side view of a piece of equipment with stiffness adjustment with a pair of stiffness adjustment devices.

Referring to FIG. 1A, a side view of a piece of equipment with stiffness adjustment 20 having a pair of stiffness adjustment devices 28 and 30 is shown. The equipment with stiffness adjustment 20 has a housing with a plurality of openings 34 and 36. Each of the openings 34 and 36 receives a casing 24 and 26. Within each of the casings 24 and 26 is located a stiffness adjustment device 28 and 30.

Each of the stiffness adjustment devices 28 and 30, also referred to as a beam stack, is formed of multiple pieces or elements. For example, the beam stacks 28 and 30 are illustrated with four pieces or elements 28A, 28B, 28C, and 28D. Each of the beam stacks may be formed with one, two, three, or more pieces forming the beam stack. Optionally, each of the pieces are positioned as layers touching neighboring pieces. While beam stacks are shown with four pieces, it is recognized that more pieces can form the stack. For example embodiments have been built with 9 layers and 16 layers.

While the beam stacks 28 and 30 are shown with the elements separated and spaced from the casings 24 and 26, the elements 28A, 28B, 28C, and 28D engage each other. In an embodiment, the corners of the stacks 28 and 30 engage the casing.

The casing 24 and 26 can take several forms. For example the casing 24 can be a stranded cable, where the cable is highly flexible in the XY and XZ planes, while capable of only tensile loads along the length of the cable, i.e. the X axis, perpendicular to the YZ plane.

It is recognized that in certain embodiments, the casing 24 and 26 might not be required. The casing is expected to make the rotatability possible or at least more convenient and consistent. A torque at one end of the beam stack might not propagate as smoothly without the casing. Thus, the casing transmits the force more or less evenly along the entire length of the beam stack.

The stiffness adjustment devices, the beam stacks, 28 and 30, also shown in FIG. 1A, have a higher bending stiffness in the XZ plane, when compared to the bending stiffness in the XY plane. The beam stack also has greater ability to exert compressive forces along the X axis than a stranded cable 20. Under compression, the strands of the cable 20 can separate from one another.

Still referring to FIG. 1A, the beam stacks provide different levels of bending stiffness dependent on several factors including materials and geometry. The geometric (i.e. non-material dependent) term in the stiffness equation is expressed in the form: (b*h3)/12 where b is the width (along the Y axis) of a rectangular and h is the height (along the Z axis). Increasing values of "b" lead to an additive ($A^1$) accretion to the stiffness equation, while increasing "h" causes an exponential ($A^3$) increase in stiffness. This property can be used to make a device highly stiff in one direction, while relatively flexible in another. By contrast, a wire with a square or circular cross section typically has the same stiffness in both directions. Because of the necessary symmetry of wires, (and cables made therefrom) "b" is always equal to "h". The factor reduces as follows: $(b*b^3)/12$ or $(b^4)/12$ adding additional wires (e.g., forming a cable), gives the following: $(b_1^4 + b_2^4 + b_3^4 + b_4^4 + \ldots + b_n^4)/12$ In such a configuration, the stiffness in the XZ plane can only be increased by stiffening the XY plane by the same amount.

The elongated cross section of various embodiments is generally analogous to a cross-section of a 2×4 piece of lumber. In many implementations, a height to width ratio (Y:Z) of at least 10:1 is used, with some implementations having a ratio of 8:1 or 4:1. This ratio may also be 10:1 or greater. Resistance to buckling can be achieved by one or more of the following means: 1) adding a sufficient number of identical (or nearly identical) pieces, e.g. parallel layers; 2) alternating thinner and thicker laminates, and 3) constraining the laminates (whether of the same or different thickness) within a casing either to prevent buckling, or to keep it within acceptable limits. A final, and less desirable, means of limiting buckling is to 4) attach one or more layers together temporarily, as with fasteners, or permanently with welding or adhesives. Joining techniques such as these can cause the properties in the joined region to approximate a solid object. Over small regions, this may be necessary or even desirable, as in the fixation of one end in order that length changes will predictably occur at the other end of the elongate laminate(s). These length changes are due to geometric considerations, in which only the "neutral axis" of a bent member is stress free, with radial segments above and below the neutral axis changing in length due to the magnitude and direction of stresses acting upon them.

In U.S. Pat. No. 7,670,351, a single set of beams is described with respect to a deflection and steering mechanism. In U.S. Patent Published Application 2010/0274088, a beam stack is described with respect to a highly specialized hinge near the tip of an endoscope or steered endoscopic accessory. Both U.S. Pat. No. 7,670,351 and 2010/0274088 are incorporated herein by reference.

Figure 1B:
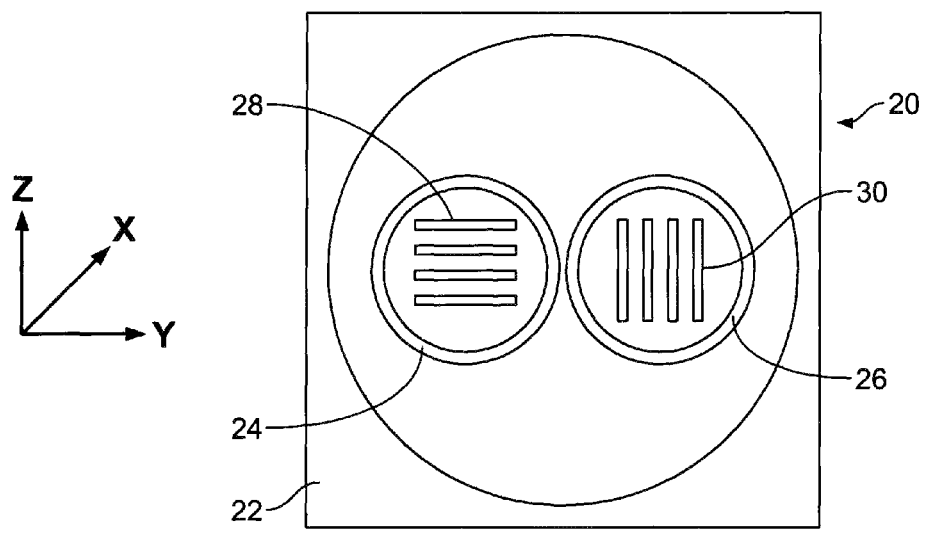
FIG. 1B is a side view of a piece of equipment with stiffness adjustment with one of the pair of stiffness adjustments rotated.

Referring to FIG. 1B, a side view of a piece of equipment with stiffness adjustment 20 having a pair of stiffness adjustment devices 28 and 30 is shown. In contrast to FIG. 1A where both of the stiffness adjustment devices, beam stacks, 28 and 30 are aligned to the Z axis, in this view the beam stack 28 has been rotated ninety degrees. This rotation reduces the stiffness in the XY plane and increases the stiffness in the XZ plane. This balances stiffness in two directions, and also can be utilized to restrain or limit buckling. The term buckling means the unstable bending of the equipment; for example the flexing of a ski as discussed below with respect to FIG. 4 and footwear in FIGS. 5A-5C.

In order to rotate the stiffness adjustment devices 28 and 30, the stack needs to be grabbed and rotated. In addition dependent on the friction, the stack may need to be retained in the proper orientation. The packaging interface with the housing 20 can be tailored to hold the stiffness adjustment devices in the desired position.

Each stiffness adjustment device is stacked, laminated beams, where stiffness is adjusted by various combinations of mechanical properties and relative motion, typically a rotation. While it is recognized that the stiffness adjustment devices 28 and 30 could in theory be switched out in the field, normally the beams would only be rotated during use such as a triathlon or the ski trip. Typically switching stiffness adjustment devices out would be a repair, either at home or in the factory.

Referring to FIG. 2, a side view of a pair of stiffness adjustments, beam stacks, 28 and 30 with a gearing system 40 for rotating the stiffness adjustment devices 28 and 30 is shown. The movement of the gearing system 40 results in both beam stacks 28 and 30 moving together. The four pieces of each beam stack 28 and 30 are parallel to each other. In this situation, the stiffness in one direction decreases as the stiffness in another direction increases. The stiffness created by the stiffness adjustment devices 28 and 30 is greatest in the direction parallel to the stacks of the stiffness adjustment devices 28 and 30.

In certain embodiments the beam stacks or stiffness adjustment devices are packed so tightly that little or no buckling can occur, due to space available. As indicated above, the stacks is shown in groups of four elements which are drawn in a sort of exploded view, in actuality in most embodiments the elements are touching each other, and the corners of the outer elements would touch the package, the casing. All this friction would tend to limit buckling with the stiffness adjustment device.

As indicated above dependent on the friction, the stack may need to be retained in the proper orientation, for example the forces placed on the stiffness adjustment devices such as from walking/skiing/other motion(s) might simply move, rotate, the stack back to the low energy state, where elements of the stack bend and flex easily. Skiing has a lot of vibration; things would tend to move to low energy states. Gearing mechanism 40 could involve actual gears, or it could be a simple pin that contacts a series of holes in the belts, or it could simply be friction between the belt and the casings 24 and 26. As will be more apparent below in describing FIGS. 4-9, the stiffness adjustment devices are just one part of the equipment with stiffness adjustment. The housing that contains the stiffness adjustment devices also has structural elements that influence the ability of the equipment to flex. The stiffness adjustment devices allow the equipment to be tailored to the conditions.

Figure 3B:
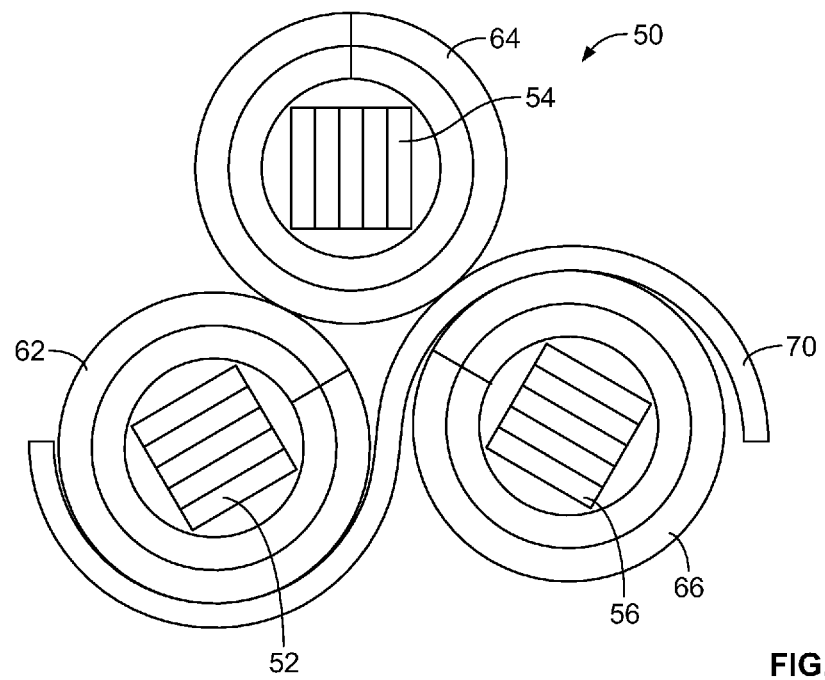
FIG. 3B is a top view of the plurality of stiffness adjustment devices encased by an external packaging of FIG. 3A.

Referring to FIG. 3A, a perspective view of a plurality of stiffness adjustment devices encased by an external packaging is shown. FIG. 3B shows the top view of the plurality of stiffness adjustment devices encased by an external packaging of FIG. 3A. The equipment with stiffness adjustment 50 has three stiffness adjustment devices, beam stacks, 52, 54, and 56. Each stack is encased with a casing 62, 64, and 66 respectively. The equipment with stiffness adjustment 50 has a gearing system 70 which each engages the casings 62 and 66. The two stiffness adjustment devices, beam stacks, 52 and 56, are connected to their respective casing 62 and 66 such that rotation of the casing causes rotation of the beam stack. The rotation of the two beam stacks 52 and 56 transforms a flat, flexible, beam-like member into the mechanical approximation of a very stiff wire, rod, or tube when the beam stacks are orientated in directions which are 120 degrees from each other.

It is also expected that the deflection, hinging, and stiffening mechanisms could be used singly or together. For example, shape, material, and location of the stacks could vary axially, with a deflecting hinge acting in one region where flexibility is needed, and the stiffening mechanism only present where stiffness, particularly adjustable stiffness must be present. For example, skis require different properties at the tip as opposed to under the boot. A ski bending or a flexible boot would have different requirements as well, based on where the ankle naturally bends.

Figure 4:
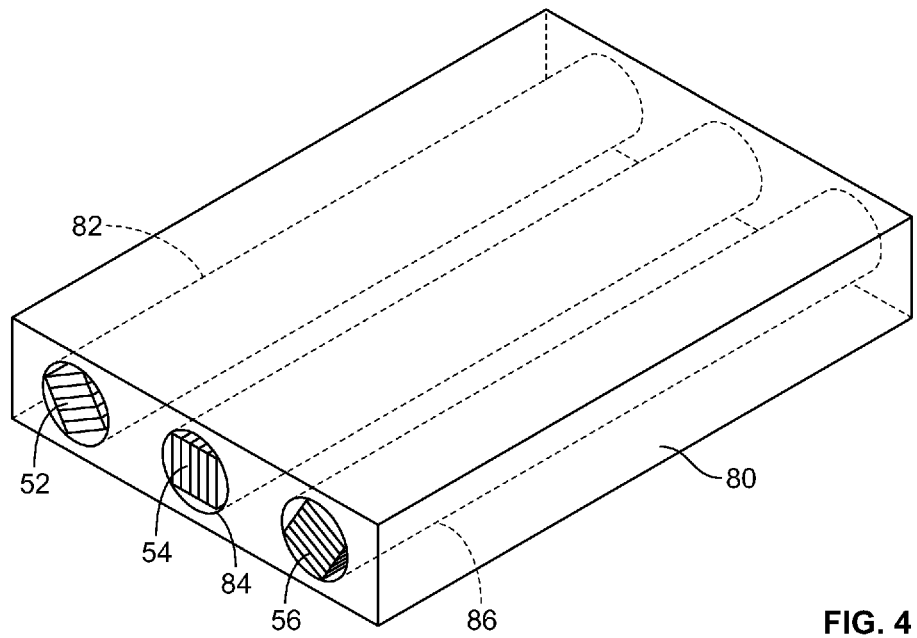
FIG. 4 is a sectional view of a ski having a plurality of stiffness adjustment devices extending longitudinally in the ski.

Referring to FIG. 4, a sectional view of a ski 80 having a plurality of stiffness adjustment devices 52, 54, and 56 extending longitudinally in the ski 80 is shown. Each stiffness adjustment device 52, 54, and 56 is received in an opening 82, 84, and 86. A user would have the capability to rotate the stiffness adjustment devices 52, 54, and 56 dependent on the weather and the condition of the slopes such as temperature, moguls, skier ability, powder vs. packed, etc. The ski could have color codes at the user stiffness adjustment device interface located at the tail of the ski to allow the user to select the proper condition.

In the embodiment shown in FIG. 4, there is no casing between the housing, the ski 80, and the stiffness adjustment devices 52, 54, and 56. The need for a casing is dependent in part on the material properties of the housing. If the stiffness adjustment devices 52, 54, and 56 can be rotated so that the beam elements can rotate as desired from one end to the other without a casing, a casing may not be required.

As indicated above, the housing of the equipment with stiffness adjustment, such as the ski 80, can be part of the stiffness device. The inherent stiffness of the housing is factored into the design of the equipment.

While a portion of the ski 80 is shown, it is recognized that other equipment such as a snowboard can be equipped with stiffness adjustment. In the snowboard, the stiffness adjustment devices would run laterally in contrast to running longitudinally in the ski 80.

Figure 5B:
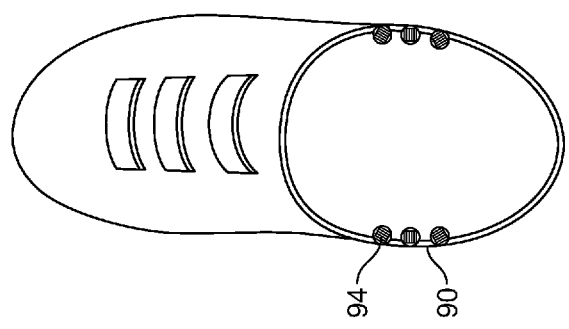
FIG. 5B is a top view of the ski boot showing a plurality of longitudinal stiffening channels.
Figure 5A:
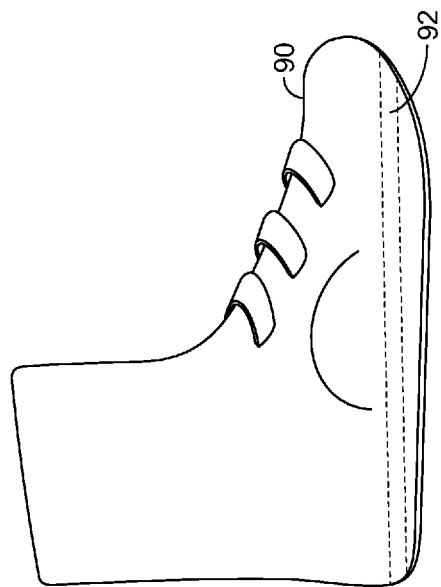
FIG. 5A is a side view of a ski boot with a sole stiffening channel shown in hidden line.

Referring to FIG. 5A, a side view of a ski boot 90 is shown with a sole stiffening channel 92 shown in hidden line. The ski boot 90 has a plurality of sole stiffening channels 92 that each receive a stiffness adjustment device. Each of the stiffness adjustment devices can be adjusted similar to the skis 80 dependent on the condition of the slopes and the user's capability. In addition, the user can adjust the stiffness for situations when not actually skiing, such as on the ski lift or in the lodge.

Referring to FIG. 5B, a top view of the ski boot 90 showing a plurality of longitudinal stiffening channels 94 is shown. In addition to the sole of the boot 90, other portions of the boot 90 can be adjusted; for example, allowing the stiffening to be adjusted by rotation of stiffness adjustment devices 28 located in the longitudinal stiffening channels 94.

Figure 5C:
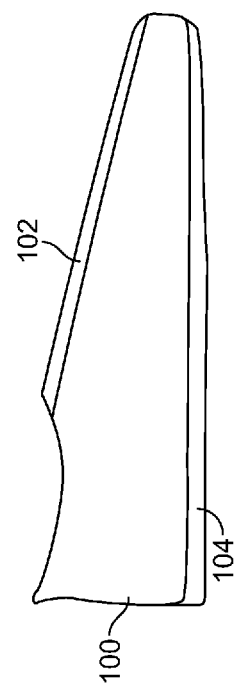
FIG. 5C is side view of a shoe having stiffness adjustment devices on the top and bottom.

Referring to FIG. 5C, a side view of a shoe 100 having stiffness on the top and bottom is shown. The shoe 100 for bicycling has both a plurality of sole stiffening channels 104 and a plurality of dorsum pedism, upper sole, stiffening channels 102; the dorsum pedism is the top of the foot. The user can adjust the stiffness for when the shoe is worn for cycling and a different stiffness for other conditions such as walking or running in the shoe 100 as in a triathlon.

Figure 6A:
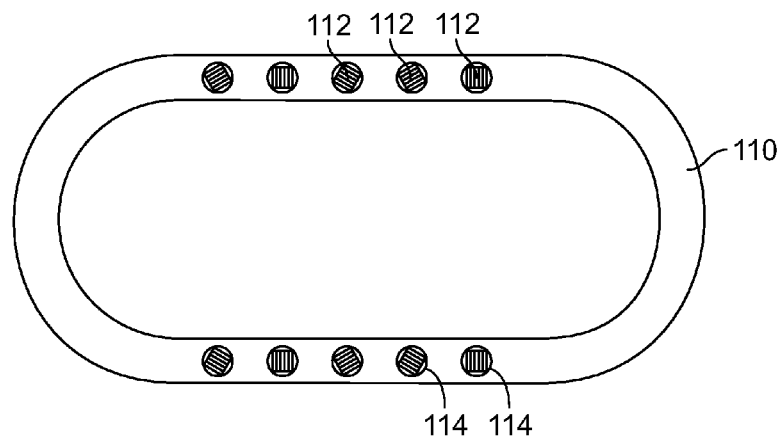
FIG. 6A is a schematic of an adjustable shoe insert.
Figure 6B:
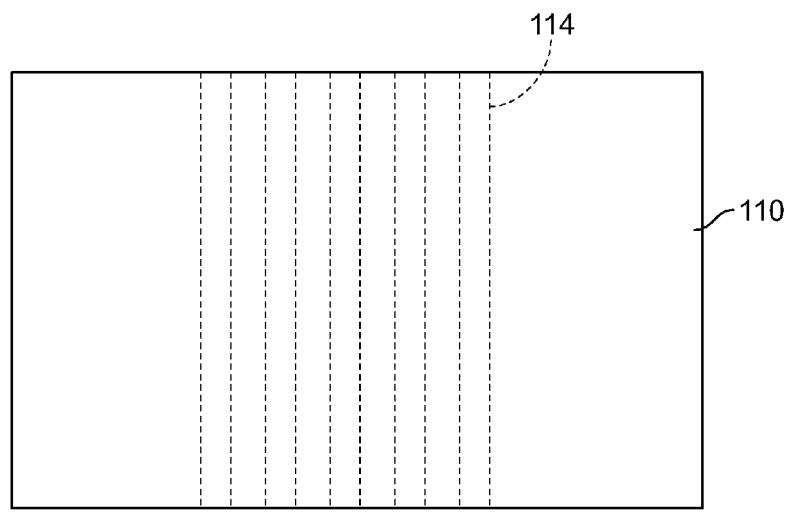
FIG. 6B is a perspective view of the adjustable shoe insert of FIG. 6A.

Referring to FIG. 6A, a schematic of an adjustable shoe 110 insert is shown. The insert 110 as configurable as an ankle support is shown. FIG. 6B is a perspective view of the adjustable shoe insert 110 of FIG. 6A. The adjustable ankle support 110 has a plurality of channels 114. Each channel 114 has a stiffness adjustment device 112.

Without adjustability, it would function analogously to the familiar "concrete rebar" where compressive loads are borne by the brittle concrete, and bending and tensile loads by the steel. In a rubber or other elastomeric/poloymeric sole, the resilient material would act as a damping mechanism, as a restraint upon buckling, and simply as a package. Oriented parallel to the axis of the digits, the flex of the sole would be controlled distinctly as to the flexion during walking, running, and climbing. Oriented at another angle, such as 30 degree or 45 degree, the effect would be more isotropic. In either case, the sole could be "tuned" to the expected use at the time of manufacture by the number and size of the embedded Endo-Lamina beams, and particularly by their orientation in the stiff or less stiff direction.

As an adjustable device, the equipment with stiffness adjustment, the adjustable shoe insert, could be moved from less stiff to more stiff to adjust to terrain. On flat terrain, speed could be enabled by a flexible sole, where the time of contact with the earth is long, and where the length of individual steps is long, linearly. When climbing, or when walking across very rough terrain (rocks, or convoluted ice), the stiff sole adjustment might be preferred. If this device were wrapped around the ankle, and especially if incorporated in a "high top" boot or sneaker, the degree of ankle support could also be adjusted: loose for speed, stiff for safety in climbing and on very rough surfaces. As an insole or integral with the sole, adjustment would presumably be made by means of a knob or lever, suitably lockable, at the rear or along the sides of the boot. As an ankle support adjustment, or as part of a ski binding, a collar could partly or completely surround the ankle, with the down (towards the sole) position being locked, and the up position being for adjustment (stiffness on/off, for example). Much as a screw is simply an inclined plane wrapped around a circular shaft, the ankle support shown in FIGS. 6A and 6B is a flat sole or insole style grid of beams, wrapped partly or wholly around the axis of the tibia and other vertically-oriented leg bones.

While a ski boot 90 and shoe 100 for bicycling are shown, it is recognized that other types of shoe including for construction, hiking, mountain climbing, and for medical reasons can incorporate stiffness adjustment devices.

Referring to FIG. 7, a top view of a tennis or racquetball racket 120 is shown without strings. After the strings are strung there still remains an unused space 122 as seen in FIG. 8B. The space 122 is capable of receiving a stiffness adjustment device. In FIG. 8A, the beam stacks of a stiffness adjustment device 126 are disposed to resist forces perpendicular to the plane of the strings. In FIG. 8B, the beam stacks of a stiffness adjustment device 126 are disposed to resist in-plane forces, primarily acting along the axes of individual strings.

The adjustment between the state shown in FIG. 8A and FIG. 8B can be done in various methods. For example, a wire, cable, or series of short rods could be disposed in a loop or chain beginning in the handle, along the outer periphery of the string area, and returning to the handle. Adjustment could be performed by a mechanism in the handle. In addition to maintaining or adjusting tension around the rim, it would twist all of the stacks together along the chain. In one embodiment, the adjustment could be adjusted continuously (as in the case of a wire or cable) or discretely, if the rods had segments in appropriate locations along the periphery. Particularly in the case of the continuous adjustment, states intermediate between the state shown in FIG. 8A and FIG. 8B could be obtained. A complex state of combined stress would exist, with some of the enhancement coming from hoop stress around the periphery, which would exist in some magnitude regardless of the state of rotation of the E-L beams.

Rotational adjustment can be achieved in a number of ways. The stiffness adjustment device can be surrounded by a coaxial gear, connected to fixed rotation between stiffness adjustment devices in a regular manner. The gear might have interrupted teeth, or be only partially toothed, in order to arrest motion at a specified limit. The stiffness adjustment device might also be disposed inside springs or tubes, then connected directly by friction. Cam surfaces might surround the devices, causing them to move in a prescribed manner.

In contrast to the embodiments show in FIGS. 4-6B, the racket 120 is shown with one stiffness adjustment device. The frame of the racket 120, which has some rigidity is a stiffness device that is not adjustable. The stiffness adjustment device 120 is surrounded by the casing 124.

Figure 9:
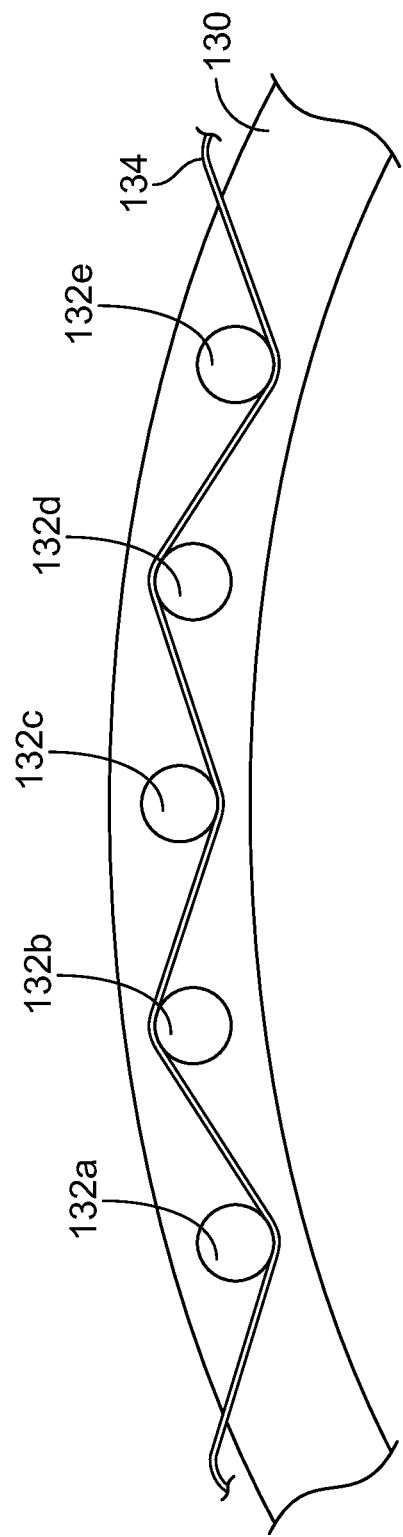
FIG. 9 is a top view of a curve device with a plurality of stiffness adjustment devices.

Referring to FIG. 9, a curve device 130 with a plurality of stiffness adjustment devices 132 is shown. The curve device 130 could be a shoe or a board. Each of the stiffness adjustment devices 132 are located in a channel in the housing of the device 130. The curve device 130 has an adjustment mechanism 134 that interacts with each of the stiffness adjustment devices 132.

If the stiffness adjustment devices, the beams stacks, are surrounded by an extension or compression spring, this spring might be connected to the adjacent, fixed member in various ways. For example, the compression spring coils (and also extension spring coils, if elastically separated) could be intertwined for all or part of the length. Instead, or in addition, the overlapping region of the coils, the axes brought near to one another so as to form a third lumen, could be filled with a wire or cable. In addition to preserving orientation, this wire could incorporate an additional function. As an actuation mechanism, it could turn the moving coil through the angular motion which adjusts stiffness. For example if referring back to FIG. 1A, the two casings 24 and 26 if compression springs are moved into overlapping engagement similar to a "Venn Diagram," the outer two lumens can have stiffness adjustment devices sized to the space and capable of rotating. The center lumen could either have a smaller adjustment device or larger stationary device.

For the greatest range of adjustment, the two or more stiffness adjustment devices, beam stacks, can be rotated. This may be particularly useful in situations where there are other constraints against buckling, such as the surrounding structure of the ski. At the apex of a newer, cross-cambered ski, the space itself is a restriction, with the top of a parabola approximating a circular arc for a substantial region. As the curvature changes, the more linear "legs" of the arch restrict buckling to a certain extent.

Figure 10:
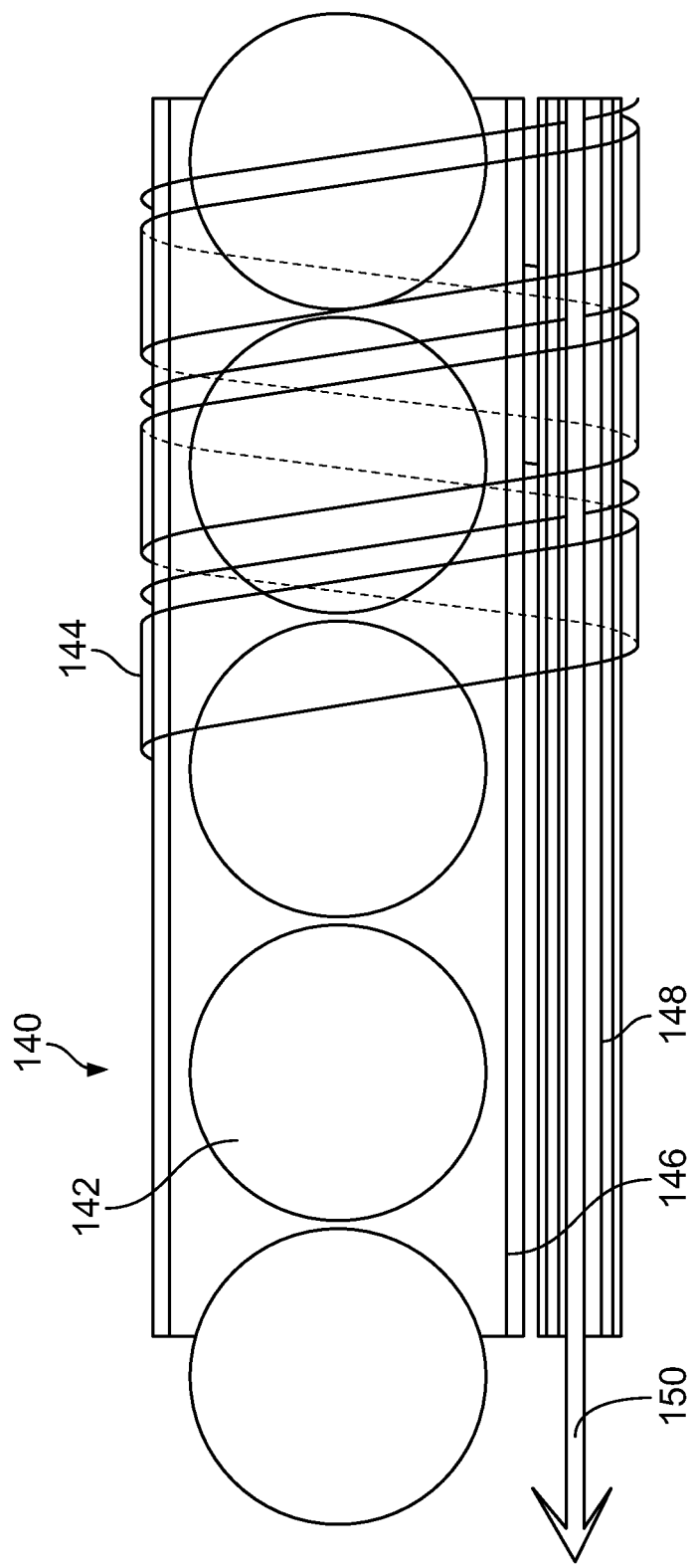
FIG. 10 is a side view of a stiffness adjustment device having a plurality of spheres and flex limiter.

Referring to FIG. 10, a side view of a stiffness adjustment device 140 having a plurality of spheres 142 and flex limiter is shown. During operation, the equipment like a ski or prosthesis moves and the assembly may be compressed by a force in the direction of the arrow (Left) 150. This is reacted by the stack of unconnected stacks, shown as spheres 142 as seen in the Figure. Collapse under load is resisted by the thin walled tube 146, and particularly by the metal or plastic coil 144, shown partly cut away in the Figure. This wrapping coil 144 would maintain its circular shape, even in a case of 90 degree bending, although the tube 146 which the coil 144 surrounds may buckle locally. The tube 146 itself could also be spiral cut for additional flexibility. A cut with the opposite hand to the external wrap may be beneficial.

In a flexible beam, a bending moment puts one surface into compression and the other into tension. While the dimensions of the beam contribute in a non-linear manner (specifically, the thickness to the third power in the invention example above), a simple beam, over a large elastic range, behaves linearly. It may be desirable to introduce a sharp non-linearity in a simple repeatable way. In a ski, for example, it may be desirable to keep the tip lifter angle from decreasing below a certain value when the combination of terrain and the inertia or weight of the skier produce a downward force beyond a certain value. A longitudinal cavity, preferably a cylinder elongated in the direction of ski length, located on the compression side of the neutral axis (normally the upper surface of a conventionally cambered ski), is suitable for various novel means of achieving this repeatable, protective non-linearity. A very stiff spring could partially fill this cavity, exerting no force until the compression exceeded a certain value. This spring, might, however, fill the cavity to such a degree that it unnecessarily augments the very bending stiffness it is intended to control. The cavity could be made larger in diameter, but this may make the ski less damage tolerant in this particular region. Therefore, an alternative is proposed: a stack of rigid or semi-rigid shapes, such as spheres 142 to immediately resist the compressive loads when a certain threshold of compression is reached and the axial space occupied by the lumen is shortened. (Note that thermal expansion effects may be significant, and the matching of materials may be critical). Such spheres also have utility in other areas, particularly those not subject to temperature extremes as encountered in winter skiing.

As indicated above with respect to FIGS. 2 and 9, if it is desirable to rotate more than one of the stiffness adjustment equipment to achieve the maximum stiffness adjustment, a wire, cable, or thick belt could be disposed. The tensile member could be attached at a different point from the S-shaped member 70 in FIGS. 3A and 3B.

The connection points could be further un-stiffened by being made from stranded cables. Deployment (the moving of the E-L beams into multiple planes to use their differential stiffness), could be effected in two or more ways: torsional springs could be deployed adjacent to the joints, or around the round cross sectional members.

Control could also be maintained by the use of stops at or near the edges of the members, such as corner bends at the edges, or finger-like slots etched and or stamped into appropriate regions of the flexible layers. The forming and use of such etched features is well known to those skilled in the art, although their application to an adjustable/expandable, variable stiffness device as described here is both novel and useful in medicine, sports equipment, aviation, and elsewhere.

While sports equipment has been described above, the equipment with stiffness adjustment can be found in other forms. For example, the stiffness adjustment devices, the beam stacks, can function as fingers and toes. The stiffness adjustment devices act as localized or continuous hinges for flexibility, and their width distributing load during grasping or locomotion. When combined with control mechanisms, these could function literally as the digits of a prosthetic hand or foot, or a robotic manipulator. As a penile implant, a pair of beam stacks would be mostly flexible when the penis is flaccid. To obtain an erection, one of the stacks would be rotated 90 degrees relative to the other, providing useful stiffness until the stack is manually rotated back. This rotation, effected extracorpeally by palpation alone, would eliminate a failure mode (fluid leakage) associated with current, pump-based penile implants. More generally, they could be used to increase the contact area of footwear, such as a hiking boot or crampon.

The stiffness adjustment equipment can have a sensor that senses the condition. The user can provide input also to reflect the user's skill level. The damping and the enhanced range of adjustable stiffnesses will also apply to other types of skis and ski-like objects, such as snowboards and water skis. For example, in both recreational water skis, and skis for float planes, wave conditions might vary greatly from day to day, and during the day due to weather variations, and changing location. It could prove difficult, inconvenient, costly, or simply impossible to have a different ski for each condition. Hence, a readily adjustable stiffness is desirable. A hand adjustment may suffice for the recreational water skier; for the float plane, the adjustment could be made via remote cable, or electrically/electronically. The adjustment could even be made in response to real-time sensors, according to a pre-programmed arrangement whereby a force or vibration reading is used to calculate appropriate adjustment to the stiffness during a landing, as required to stabilize or otherwise assist in the landing process. A different stiffness might adjust a value, such as a resonant frequency, further away from an undesirable result. The system described above may provide a comfortable, soft landing in ordinary conditions, but a safer, albeit rougher (stiffer and/or less damped), landing during inclement weather.

Another example is a control mechanism, and/or the pre-deployed digits, that could be contained in a space between the crampon's contact area and the sole of the boot. Using the space between the crampon's spikes is less desirable, as this region may be needed on very uneven terrain or ice, to allow the spike tips to contact and dig into ice, snow, or frozen earth.

In an embodiment, the stiffness of a piece of rectangular steel of 1 inch by ¼ inch is $1.3 \times 10^{-3}$ in$^4$ in the low stiffness state, and 8 times higher in the high stiffness state, the other. The same cross sectional space, filled with a beam element having 25 pieces each free to slide against one another and 0.010" thick, gives a low stiffness value of $2.08 \times 10^{-6}$ in 4 or 1/625th of the value of the solid beam of identical shape (the difference in thickness raised to the second power). The stiffness of the beam element together is identical to the solid beam in the high stiffness state, since the 0.010 "thickness" is now simply width, and the width term is additive. If a lower ratio is desired, and/or if cost is a consideration, the number of beams can be adjusted downward, with an associated savings in material cost and labor (i.e. assembly) costs. (It is well known in the arts of mechanical and manufacturing engineering that assembly cost is driven by both the cost of an individual component, and the number of components. More numerous components, regardless of cost, require additional expenses during design, test, qualification, purchasing, inspection, stocking, materials handling and assembly.)

It is recognized that the location of the stiffness adjustment device in the housing affects the adjustment. The stiffness adjustment devices could be disposed closer to, or further from, the neutral axis depending on the degree of stiffness and degree of adjustability desired. For example, a device intended to be very flexible in the relaxed condition would dispose the elements very near, or directly on, the overall neutral axis of the assembly. Other devices might desire a "stiff and stiffer" adjustment, and so locate the stiffness adjustment device farther from the neutral axis. In either case, the enhanced range due to the use of stiffness adjustment devices increases the adjustability of the device or equipment.

Rotational adjustment can be achieved in a number of ways. The items may each be surrounded by a coaxial gear, connected to fix rotation between them in a regular manner. The gear might have interrupted teeth, or be only partially toothed, in order to arrest motion at a specified limit. The items might also be disposed inside springs or tubes, then connected directly by friction. Cam surfaces might surround the devices, causing them to move in a prescribed manner. If the rotatable stiffness devices are surrounded by an extension or compression spring, this spring might be connected to the adjacent, fixed member in various ways. For example, the compression spring coils (and also extension spring coils, if elastically separated) could be intertwined for all or part of their length. Instead, or in addition, the overlapping region of the coils, the axes brought near to one another so as to form a third lumen, could be filled with a wire or cable. In addition to preserving orientation, this wire could incorporate an additional function. As an actuation mechanism, it could turn the moving coil through the angular motion which adjusts stiffness.

For the greatest range of adjustment, the plurality of rotatable stiffness devices, beam elements, could be rotated. This may be particularly useful in situations where there are other constraints against buckling, such as the surrounding structure of the ski. At the apex of a newer, cross-cambered ski, the space itself is a restriction, with the top of a parabola approximating a circular arc for a substantial region. As the curvature decreases, the more linear "legs" of the arch restrict buckling to a certain extent.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

It is recognized that the plurality of stiffness adjustment devices can be used in other devices such as seats for vehicles, such as an automobile seat.

It is recognized that the numerous metal on metal interfaces of the beam stack are also expected to provide significant frictional damping. Should this damping be undesirable for any reason, coatings or interlayers of low friction materials may be provided.

It is recognized that while the stacks of the elements are shown as rectangular beams, other shapes such as elongated flattened ribbon are contemplated.

What is claimed:

1. A device with stiffness adjustment comprising:
   a housing having a plurality of passageways and each defining a respective passageway axis;
   a plurality of stiffness devices provided within the plurality of passageways, each stiffness device including a plurality of flat springs elongated in the direction of its respective passageway axis; and
   the plurality of stiffness devices each being axially rotatable about its respective passageway axis of its respective passageway.

2. A device with stiffness adjustment of claim 1 further comprising a casing interposed between the wall of the passageway and the housing and the stiffness devices.

3. A device with stiffness adjustment of claim 2 wherein the casing is a spring.

4. A device with stiffness adjustment of claim 1 wherein at least two of the plurality of rotatable stiffness devices are rotatable about their respective passageway axis between at least two distinct positions.

5. A device with stiffness adjustment of claim 4 wherein the at least two of the plurality of rotatable stiffness devices have a gearing mechanism for facilitating rotation.

6. A device with stiffness adjustment of claim 4 wherein the at least two of the plurality of rotatable stiffness devices have an engaging mechanism.

7. A device with stiffness adjustment of claim 4 wherein the at least two of the rotatable plurality of stiffness devices having an aperture adapted to receive a tool for adjusting the stiffness of the device.

8. A device with stiffness adjustment of claim 1 wherein at least two of the plurality of rotatable stiffness devices are rotatable in a group.

9. A device with stiffness adjustment of claim 8 further comprising a geared strip and the at least two of the plurality of rotatable stiffness devices, the geared strip coupled to the at least two of the plurality of rotatable stiffness device for rotating the rotatable of stiffness devices to adjust the stiffness of the device.

10. A device with stiffness adjustment of claim 1 wherein the process of rotating the plurality of rotatable of stiffness is automated.

11. A device with stiffness adjustment of claim 10 wherein the automated process is controlled by a user.

12. A device with stiffness adjustment of claim 10 further comprising a sensor wherein the automatic process is controlled by the sensor.

13. A device with stiffness adjustment of claim 1 wherein the housing is a prosthesis.

14. A device with stiffness adjustment of claim 1 wherein the plurality of stiffness devices each has a rectangular cross section having a ratio between a height dimension and a width dimension of at least 4:1.

15. A device with stiffness adjustment comprising:
    a housing having at least one passageway having a defining axis; and
    a stiffness adjustment unit disposed within a portion of the passageway, the stiffness adjustment unit being axially rotatable within the passageway about the defining axis,
    wherein the stiffness adjustment unit is comprised of:
       a plurality beams, the plurality of beams having a varying resistance profile depending on a relative direction of a force being applied thereto, and
       a flexible cover encasing the plurality of beams.

16. The device of claim 15 wherein the plurality of beams are bound at one end.

17. The device with stiffness adjustment of claim 15, further comprising a second passageway having a second stiffness adjustment rotatably disposed within a portion of the second passageway.

18. The device with stiffness adjustment of claim 15, further comprising a second stiffness adjustment unit disposed and rotatable within the passageway.

19. The device with stiffness adjustment of claim 18, further comprising a gearing mechanism in mechanical communication of the stiffness adjustment units,
    wherein actuating the gearing mechanism simultaneously rotates each of the stiffness adjustment units.

20. A device with stiffness adjustment of claim 15 wherein the housing is sporting equipment.

21. A device with stiffness adjustment of claim 20 wherein the housing is from the sporting equipment group of snow skis, snowboards, shoes, boots, water skis, hockey sticks, golf clubs, tennis rackets, racquetball rackets, and squash rackets.

22. The device with stiffness adjustment of claim 17, wherein the plurality of beams each has a rectangular cross section having a ratio between a height dimension and a width dimension of at least 4:1.

23. The device with stiffness adjustment of claim 17, wherein the flexible cover is a coil.

* * * * *